Jan. 18, 1927.
A. T. KASLEY
1,614,558
METHOD OF CUTTING ELEMENTAL SLOTS IN CYLINDRICAL BODIES
Original Filed Sept. 30, 1921   2 Sheets-Sheet 1
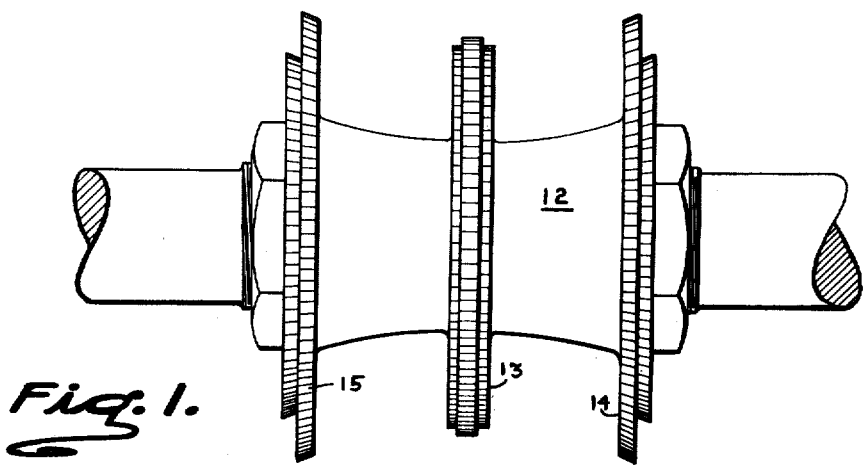
Fig. 1.
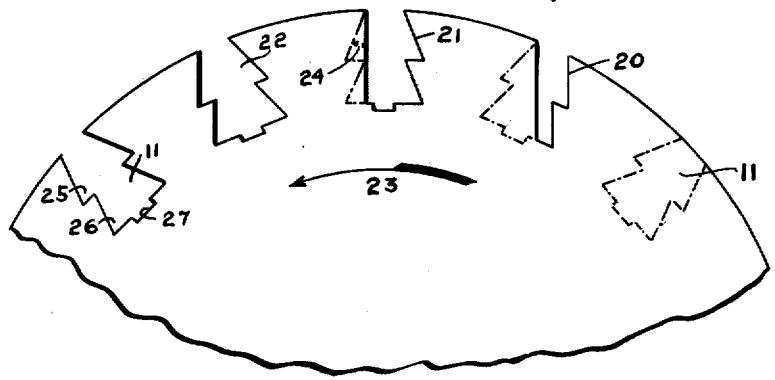
Fig. 2.
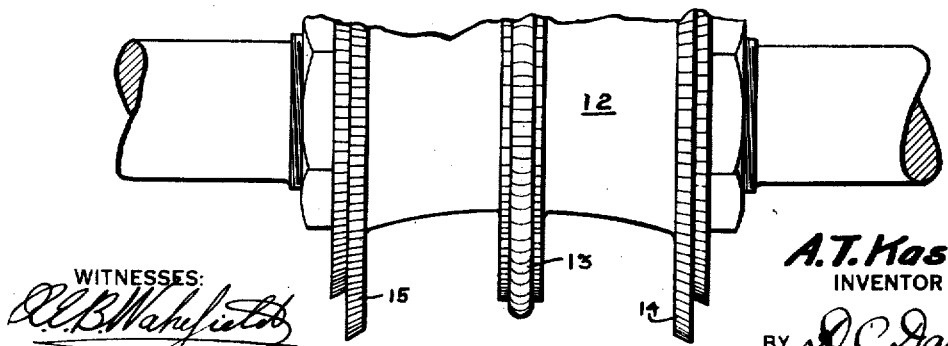
A. T. Kasley
INVENTOR
BY D. C. Davis
ATTORNEY Jan. 18, 1927.

A. T. KASLEY 1,614,558

METHOD OF CUTTING ELEMENTAL SLOTS IN CYLINDRICAL BODIES

Original Filed Sept. 30, 1921    2 Sheets-Sheet 2

WITNESSES

A. T. Kasley
INVENTOR

BY

ATTORNEY

Patented Jan. 18, 1927.                                                    1,614,558

UNITED STATES PATENT OFFICE.

ALEXANDER T. KASLEY, OF ESSINGTON, PENNSYLVANIA, ASSIGNOR TO WESTINGHOUSE ELECTRIC AND MANUFACTURING COMPANY, A CORPORATION OF PENNSYLVANIA.

METHOD OF CUTTING ELEMENTAL SLOTS IN CYLINDRICAL BODIES.

Original application filed September 30, 1921, Serial No. 504,338. Divided and this application filed September 28, 1923. Serial No. 665,447.

My invention relates to apparatus for cutting novel elemental slots in cylindrical bodies and has for its object to provide a method and apparatus of the character designated for forming the slots simple of operation and which involves a small number of machining operations.

Figure 3:
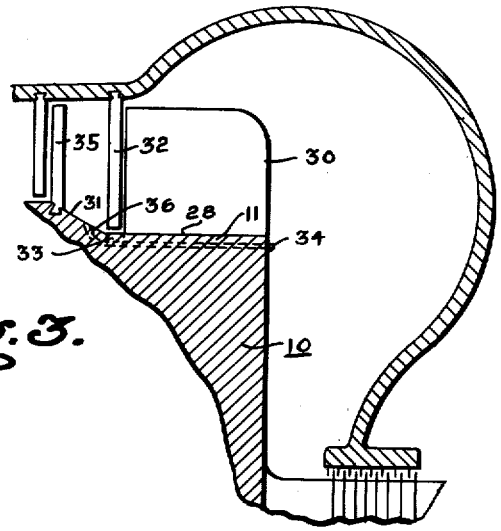
Figure 4:
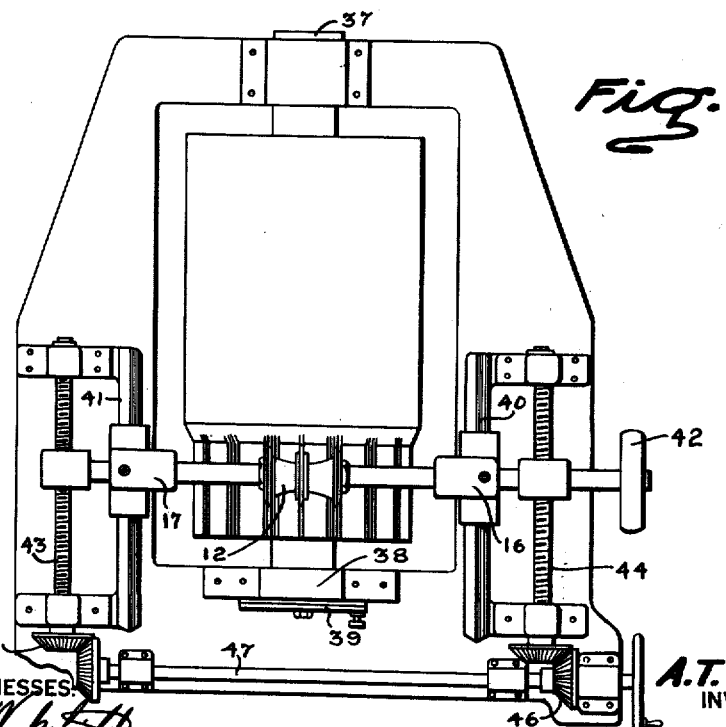

By way of illustrating my invention, in Fig. 1 of the accompanying drawing, I show an end view of a turbine spindle together with a gang of milling cutters arranged for the machining thereof in accordance with my invention; Fig. 2 is a partial side view of a modified form of milling cutter; Fig. 3 is a side view, partially in section and partially in elevation, of a portion of a completed turbine spindle illustrating my invention; and Fig. 4 is a plan view showing diagrammatically the relationship of the milling cutters and a blank.

While, by way of illustration, I show my invention employed in the cutting of elemental grooves for the mounting of blades on the spindle of a turbine it is obviously not so limited but may be employed wherever it is desired to cut such grooves in any appropriate body.

In many cases where elemental slots are required in a cylindrical body it is desirable that such slots be formed with an undercut contour, forming the pieces to be mounted in the slots such, for instance, as the blades of a turbine, with appropriate roots, and slip them into the slots, subsequently locking them in place as by the insertion of a suitable locking member.

I find that great economies, both in time and expense, may be effected in the cutting of these slots to undercut them in an angle of substantially $n a$ where $n$ is any whole number and $a$ is the central angle subtended by a pair of adjacent slots, and by cutting these slots by a gang miller. Preferably, the miller comprises lateral and central cutters, one lateral cutter making the initial slot cut with undercut portions for one side, the central cutter then being brought into action for removing some of the material of the blank to assure more uniform spacing of the slot walls to render subsequent cutting easier, and to provide for a countersunk wedge groove at the bottom of the slot, and finally, the other lateral cutter finishes the slot by providing undercut portions for the other side of the slot. Each slot therefore represents the effect of the three cutting operations of the cutters; and, in operation, the miller cuts portions of three slots simultaneously, the first lateral cutter beginning a slot and the other lateral cutter finishing it. As each slot is finished, the arbor is indexed to begin a new slot. In this manner, by taking a milling cut and by the appropriate rotation of the spindle, the undercut slots may be produced with great speed and accuracy.

Referring to the drawing for a more detailed understanding of my invention, I show a portion of the cylinder of a turbine spindle at 10 in Figs. 1 and 3. For the mounting of the turbine blade, it is desirable to cut longitudinal or elemental slots in the surface of the cylinder 10 of the shape shown at 11—11; and, for this purpose, the spindle 10 is brought to operative proximity to a gang miller 12 embodying a central milling cutter 13 and lateral milling cutters 14 and 15. The gang miller 12 is suitably journaled as shown at 16 and 17 (Fig. 4) and the journals may move longitudinally as hereinafter described in order to permit the longitudinal travel of the milling cutters through the slots.

Owing to the peculiar conformation of the milling cutters, the cutter 14 cuts the undercut portions and a portion of the central part of a slot as indicated in full lines at 20; at the same time, the central cutter 13 brings the adjacent slot to the shape shown in full lines at 21; and, also simultaneously, the cutter 15 brings the next slot to the completed shape shown at 22, these respective cutting operations being those employed after the apparatus is in operation and at least three slots have been cut. After the completion of one cut, the cutters are withdrawn and the spindle 10 is rotated through an angle corresponding to the slot pitch in the direction indicated by an arrow 23, and this operation is repeated until the entire spindle is slotted.

Obviously, in the first three slots to be machined, the respective portions of metal to be removed by each cutter are different from those above described, although the final result is the same.

It will be noted that a pair of slots subtends an angle a at the center of the spindle and it will also be noted that the angle of undercutting indicated at 24 is equal to a when the milling cutters are operating on immediately adjacent slots; although, if the arrangement be such that the cutters simultaneously operate on alternate slots it will be obvious that the angle of undercutting is 2 a, or, more generally speaking, if the cutters simultaneously operate on slots spaced apart by "n" pitch spaces, the angle of undercutting will be n a.

The resulting slot is of the double dovetail type inasmuch as it has upper undercut portions 25 and lower undercut portions 26 and also at the bottom thereof there is cut a straight groove 27 for the receipt of a packing piece as will be hereinafter described.

Turning to Fig. 3, the relationship of the slots, hereinbefore referred to, to a rotor will be apparent. In this view, I show the rotor 10 provided with a portion 28 of reduced diameter having the longitudinal slots 11 of the double dove-tail type and adapted to receive complementally formed root portions of the relatively wide blades 30. The portion 28 may be joined to the main portion of the rotor through a tapered portion 31.

The provision of the tapered portion 31 provides clearance for the milling cutter, thus permitting the cutting of a slot of full cross-section throughout the entire length of the reduced portion 11, the milling cutter finishing its operation in the portion 31.

A row of moving blades 35 may be mounted on the portion 31 and a row of fixed guide blades 32 are secured to the casing and serve to guide the steam into the blades 30. Filler pieces 36 are placed in the slot portions lying in the portion 31 to prevent steam leakage by the blades 32.

After the blades 30 are inserted in the slots 11, wedges 34 are inserted in the countersunk grooves at the bottoms of the double dove-tail grooves 11 in order to firmly wedge the root portions of the blades in the slots.

Rather than employing a straight-sided locking groove in the bottom of the slot, a groove with semi-circular bottom may be employed for the receipt of an expansible locking tube, as disclosed and claimed in my co-pending application Serial No. 527,674, filed January 7, 1922, and assigned to Westinghouse Electric and Manufacturing Company. For the cutting of a locking groove of this type, a milling cutter of the form shown in Fig. 2 may be employed.

From the foregoing, the operation of cutting longitudinal slots of a double dove-tail or similar type will be apparent. Upon reference to Fig. 4, it will be seen that the blank or rotor element is supported by a suitable machine frame having bearing portions 37 and 38 for journal portions of the rotor, and suitable indexing mechanism 39 is associated with one end of the rotor so that the latter may be properly indexed for cutting the slots. The milling cutter is carried in the journal bearing portions 16 and 17, the latter being fitted to guides 40 and 41 so that the journal portions may be traversed back and forth in order to give the miller the proper degree of motion to cut the longitudinal slots.

As shown in Fig. 4, the gang miller 12 may be driven by any suitable means, for example, the belt pulley 42. Mechanism is shown for traversing the gang miller bearings and may comprise, for example, screw shafts 43 and 44 associated with the bearings 17 and 16, respectively, and operated by any suitable means, for example, the sets of bevel gears 45 and 46 which derive motion from a suitable drive shaft 47.

The cylindrical body is placed in the bearings 37 and 38 of the milling machine and the latter is operated to cut the double dove-tail grooves. In the process of cutting, the gang of three cutters operates to cut portions of three grooves simultaneously, the lateral cutters cutting the sides and the middle cutter making a central cut and also cutting the countersunk grooves. After the cutting of each groove is completed, the blank is appropriately indexed in order to start cutting a fresh groove.

It will be obvious to those skilled in the art that the machine and method may be utilized for the purpose of cutting undercut slots in any appropriate member, for example, dynamo armatures and the like.

From the foregoing, it will be seen that I have provided very simple means for securing turbine blades of the character referred to firmly in position and that the means and the method are economical to operate and to effect.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. The method of cutting a series of equi-spaced longitudinal undercut slots in the surface of a cylinder which comprises mounting said cylinder in operative proximity to a gang of milling cutters having their axis parallel to a tangent to the surface of said cylinder, milling out the central portion of said slot with a centrally disposed cutter and milling out the respective undercut sides of said slots with cutters disposed respectively on the opposite sides of said central cutter.

2. The method of cutting a series of equispaced longitudinal undercut slots in the surface of a cylinder which comprises mounting said cylinder in operative proximity to a gang of milling cutters having their axis parallel to a tangent to the surface of said cylinder, and simultaneously milling out the central portion of one slot with a central miller, one side of an adjacent slot with an adjacent cutter, and the other side of an adjacent slot on the other side of said first-mentioned slot with another adjacent cutter.

3. The method of cutting longitudinal slots in the surface of a cylinder spaced apart by a central angle $a$ which comprises milling out a portion of a slot by cutter rotating in a radial plane, turning the cylinder through an angle $a$ and milling out an undercut portion on the wall of said slot by a cutter rotating in a plane parallel to that of said first-mentioned cutter.

4. The method of cutting longitudinal slots in the surface of a cylinder spaced apart by a central angle $a$ which comprises milling out a portion of a slot by a cutter rotating in a radial plane, turning the cylinder through an angle $n\ a$ where "$n$" is any whole number, and milling out an undercut portion on the wall of said slot by a cutter rotating in a plane parallel to that of said first-mentioned cutter.

5. The method of cutting longitudinal slots in the surface of a cylinder, spaced apart by a central angle $a$, which comprises milling out a portion of a slot by a milling cutter rotating in a radial plane and simultaneously milling out an undercut portion in the wall of a slot $n$ slots removed from said slot at an angle of $n\ a$, where "$n$" is any whole number, by a milling cutter rotating in a plane parallel to that of said first-mentioned cutter.

6. The method of cutting a series of equispaced longitudinal undercut slots in the surface of a cylinder which comprises mounting said cylinder in operative proximity to a gang of milling cutters having a common axis parallel to a tangent to the surface of said cylinder, and simultaneously milling out a portion of each of two slots with two cutters of said gang, each of said two cutters milling out the side of the slot farthest from the other slot being cut.

7. The method of cutting a series of equispaced longitudinal undercut slots in the surface of a cylinder which comprises mounting said cylinder in operative proximity to a gang of milling cutters having a common axis parallel to a tangent to the surface of said cylinder, and simultaneously milling out a portion of one slot with one cutter of said gang and the distant side of another slot to form an undercut side with another cutter of said gang.

In testimony whereof, I have hereunto subscribed my name this 24th day of September, 1923.

ALEXANDER T. KASLEY.

ly on the opposite sides of said central cutter.

2. The method of cutting a series of equi-spaced longitudinal undercut slots in the surface of a cylinder which comprises mounting said cylinder in operative proximity to a gang of milling cutters having their axis parallel to a tangent to the surface of said cylinder, and simultaneously milling out the central portion of one slot with a central miller, one side of an adjacent slot with an adjacent cutter, and the other side of an adjacent slot on the other side of said first-mentioned slot with another adjacent cutter.

3. The method of cutting longitudinal slots in the surface of a cylinder spaced apart by a central angle $a$ which comprises milling out a portion of a slot by cutter rotating in a radial plane, turning the cylinder through an angle $a$ and milling out an undercut portion on the wall of said slot by a cutter rotating in a plane parallel to that of said first-mentioned cutter.

4. The method of cutting longitudinal slots in the surface of a cylinder spaced apart by a central angle $a$ which comprises milling out a portion of a slot by a cutter rotating in a radial plane, turning the cylinder through an angle $n\ a$ where "$n$" is any whole number, and milling out an undercut portion on the wall of said slot by a cutter rotating in a plane parallel to that of said first-mentioned cutter.

5. The method of cutting longitudinal slots in the surface of a cylinder, spaced apart by a central angle $a$, which comprises milling out a portion of a slot by a milling cutter rotating in a radial plane and simultaneously milling out an undercut portion in the wall of a slot $n$ slots removed from said slot at an angle of $n\ a$, where "$n$" is any whole number, by a milling cutter rotating in a plane parallel to that of said first-mentioned cutter.

6. The method of cutting a series of equi-spaced longitudinal undercut slots in the surface of a cylinder which comprises mounting said cylinder in operative proximity to a gang of milling cutters having a common axis parallel to a tangent to the surface of said cylinder, and simultaneously milling out a portion of each of two slots with two cutters of said gang, each of said two cutters milling out the side of the slot farthest from the other slot being cut.

7. The method of cutting a series of equi-spaced longitudinal undercut slots in the surface of a cylinder which comprises mounting said cylinder in operative proximity to a gang of milling cutters having a common axis parallel to a tangent to the surface of said cylinder, and simultaneously milling out a portion of one slot with one cutter of said gang and the distant side of another slot to form an undercut side with another cutter of said gang.

In testimony whereof, I have hereunto subscribed my name this 24th day of September, 1923.

ALEXANDER T. KASLEY.

CERTIFICATE OF CORRECTION.

Patent No. 1,614,558.      Granted January 18, 1927, to

ALEXANDER T. KASLEY.

It is hereby certified that error appears in the printed specification of the above numbered patent requiring correction as follows: Page 3, line 10, claim 2, for the word "miller" read "cutter"; and that the said Letters Patent should be read with this correction therein that the same may conform to the record of the case in the Patent Office.

Signed and sealed this 10th day of May, A. D. 1927.

M. J. Moore,
Acting Commissioner of Patents.

Seal.

CERTIFICATE OF CORRECTION.

Patent No. 1,614,558.  Granted January 18, 1927, to

ALEXANDER T. KASLEY.

It is hereby certified that error appears in the printed specification of the above numbered patent requiring correction as follows: Page 3, line 10, claim 2, for the word "miller" read "cutter"; and that the said Letters Patent should be read with this correction therein that the same may conform to the record of the case in the Patent Office.

Signed and sealed this 10th day of May, A. D. 1927.

Seal.

M. J. Moore,
Acting Commissioner of Patents.